(12) United States Patent
Heist et al.

(10) Patent No.: US 7,996,855 B2
(45) Date of Patent: Aug. 9, 2011

(54) PERSONAL MESSAGING APPLICATION PROGRAMMING INTERFACE FOR INTEGRATING AN APPLICATION WITH GROUPWARE SYSTEMS

(75) Inventors: Pete Heist, Yardley, PA (US); Nathan Cole, Lansdale, PA (US); Jonathan Michael Hurley, East Windsor, NJ (US); Kevin John Agatone, West Chester, PA (US); Jeffrey Thomas Sposetti, Superior, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1229 days.

(21) Appl. No.: 11/522,240

(22) Filed: Sep. 15, 2006

(65) Prior Publication Data

US 2008/0126486 A1 May 29, 2008

(51) Int. Cl.
*G06F 9/44* (2006.01)
*G06F 9/46* (2006.01)
*G06F 15/16* (2006.01)

(52) U.S. Cl. ........ 719/330; 717/104; 717/110; 717/116; 719/315; 719/328; 709/201

(58) Field of Classification Search .......... None
See application file for complete search history.

(56) References Cited

U.S. PATENT DOCUMENTS

| | | | | |
|---|---|---|---|---|
| 5,913,061 | A * | 6/1999 | Gupta et al. | 719/310 |
| 6,192,419 | B1 * | 2/2001 | Aditham et al. | 719/315 |
| 6,516,349 | B1 * | 2/2003 | Lieberman | 709/225 |
| 7,257,818 | B2 * | 8/2007 | Foerg et al. | 719/310 |
| 7,284,010 | B2 | 10/2007 | Rajan et al. | |
| 7,330,537 | B2 * | 2/2008 | Frifeldt et al. | 379/88.13 |
| 7,343,428 | B2 * | 3/2008 | Fletcher et al. | 709/250 |
| 7,383,302 | B2 * | 6/2008 | Cohen et al. | 709/205 |
| 7,484,202 | B2 * | 1/2009 | Cheng et al. | 717/120 |
| 2004/0215635 | A1 | 10/2004 | Chang et al. | |
| 2005/0149342 | A1 | 7/2005 | Chao et al. | |
| 2005/0289160 | A1 | 12/2005 | Ashwin et al. | |
| 2006/0026193 | A1 | 2/2006 | Hood | |
| 2006/0089990 | A1 | 4/2006 | Ng et al. | |
| 2006/0177023 | A1 | 8/2006 | Vaghar et al. | |
| 2006/0184473 | A1 | 8/2006 | Eder | |
| 2006/0271933 | A1 * | 11/2006 | Agassi et al. | 718/100 |
| 2007/0112851 | A1 | 5/2007 | Tomic et al. | |
| 2007/0283020 | A1 | 12/2007 | Chowdary et al. | |
| 2008/0016014 | A1 | 1/2008 | Sigal et al. | |
| 2008/0021912 | A1 | 1/2008 | Seligman et al. | |

* cited by examiner

*Primary Examiner* — Michael J. Yigdall
(74) *Attorney, Agent, or Firm* — Fliesler Meyer LLP

(57) ABSTRACT

A personal messaging application programming interface can be utilized by a developer in order to add groupware functionality to an application. The interface can include various schemas and providers that allow the schemas to connect to a collaboration server which provides the groupware functionality. The schemas can further include item and container classes and can extend other schemas so as to provide functionality that is more specific to the collaboration server. The items and containers can represent various entities on the collaboration server. The providers can use stubs in order to create connections to the collaboration server and can implement the schema hierarchy so as to map the functionality defined by the schema into various core calls on the collaboration server.

19 Claims, 8 Drawing Sheets

PERSONAL MESSAGING APPLICATION PROGRAMMING INTERFACE FOR INTEGRATING AN APPLICATION WITH GROUPWARE SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related and cross-referenced to the following applications which are incorporated herein by reference:

U.S. patent application Ser. No. 11/539,492 entitled "GROUPWARE PORTLETS FOR INTEGRATING A PORTAL WITH GROUPWARE SYSTEMS" by Jeff Sposetti filed on Oct. 6, 2006.

U.S. patent application Ser. No. 11/473,571 entitled "SYSTEM AND METHOD FOR PROVIDING AN SPI BRIDGE FOR CONTENT MANAGEMENT SYSTEM" by Ryan McVeigh et al., filed on Jun. 23, 2006.

FIELD OF THE INVENTION

The invention relates generally to groupware systems and in particular to providing an interface for allowing applications to access groupware functionality.

BACKGROUND OF THE INVENTION

A large portion of communication and information associated with an enterprise is often stored personal information management (PIM) and groupware systems in the form of emails, address books, task lists, and appointments, as well as other proprietary tools. At the same time, customized Customer Relations Management (CRM) systems are often needed in order to keep track of information about a specific customer and product base and to generally provide relevant business processes and scalability. Thus, organizations today must integrate groupware with more traditional information systems such as CRM, enterprise resource planning (ERP) and others. Unfortunately, the proprietary nature of groupware and PIM systems typically makes it difficult and expensive for an enterprise to integrate their data and information into other applications.

FIG. 1 shows an illustration of a typical enterprise system as available in the prior art. For example, many business organizations implement collaboration systems such as Microsoft Exchange® Server and Lotus Domino®. Thus, employees 100 may use the email systems such as Microsoft Outlook 102 provided by the MS Exchange server 106 in order to communicate, keep track of appointments, contacts, tasks, meetings and generally collaborate amongst each other when working on various projects. At the same time CRM applications 104 can provide access to account management, opportunities and prospects maintained in a customer relations database 108. A significant part of the functionality provided by these separate systems often overlaps thereby creating inconsistencies and missing information which can impede performance and profitability of a company. For example, an employee may schedule an appointment with a customer via the CRM application 104 but that appointment may not be created or updated in the collaboration server 106 such as Microsoft Exchange. Alternatively, if an employee uses the groupware system to create the appointment, the CRM database may not be properly updated thereby causing missing information and inaccurate views of the customer.

The result is that in many enterprises frustrated users toggle between groupware and other applications, duplicating work and data—often with dubious integrity or efficiency. What is needed is an improved system of integration, one that would facilitate interoperability between proprietary groupware and PIM systems and custom enterprise applications. For example, it may be desireable for a custom Java application to gain acess to personal contacts, email and appointments without having to know the complexities of proprietary groupware and PIM provider. It may also be desireable for such functionality to be achieved non-intrusively, without causing disruption to the rest of the enterprise.

DETAILED DESCRIPTION

Figure 1:
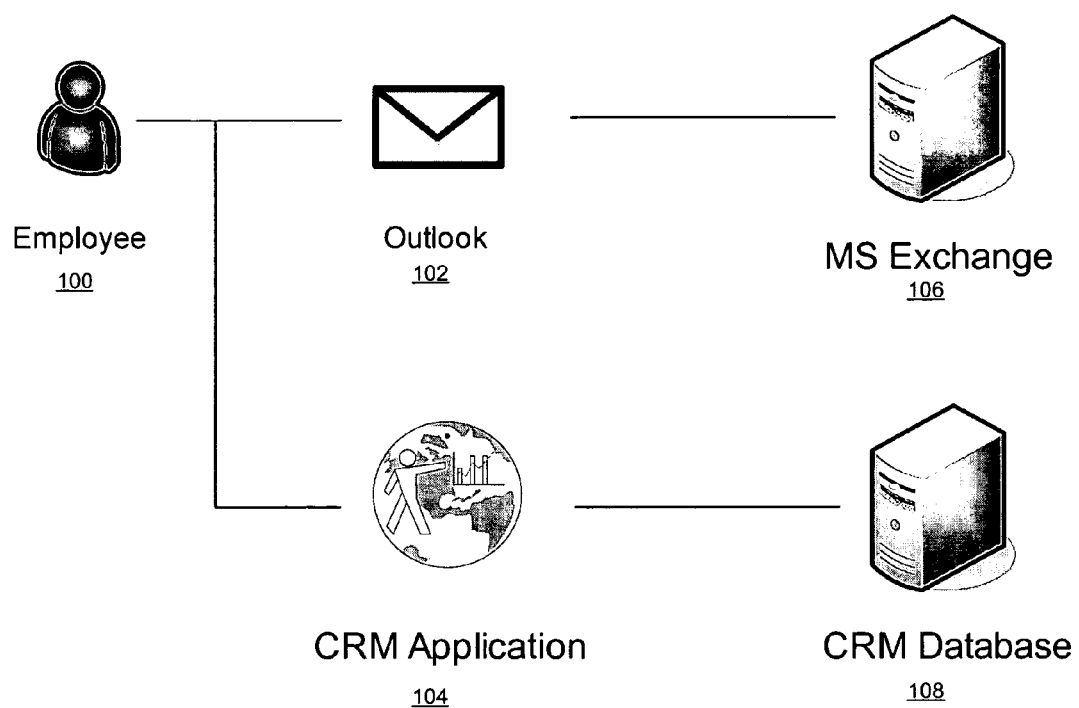
FIG. 1 shows an illustration of a typical enterprise system as available in the prior art.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with various embodiments of the invention, a personal messaging interface is presented, that facilitates interoperability between an application and a collaboration system such as those provided by Microsoft Exchange® Server and Lotus Domino®. Of course, the system is not limited to these two forms of collaboration servers and others can be implemented within the scope of the present invention. The personal messaging interface can be implemented as a collection of Java Application Programing Interface (API) libraries that can be integrated into Java-based applications such as portals, web applications or standalone Java® applications.

In various embodiments, the personal messaging interface can be used by the developer when creating, deploying and working with applications in the enterprise. Thus, instead of having to know the specific interface of the collaboration system (e.g. MAPI, Lotus Notes C API, federated content management API, etc.) that is chosen by the enterprise, the developer can instead implement the personal messaging interface to integrate the application with the collaboration system. Subsequently, the application can connect to any of the many types of collaboration servers without the need to rewrite code and re-perform other work normally required when developing applications.

In one embodiment, the personal messaging interface can consist of a schema and several providers, as well as an interface between the schema and the providers. The schema can be thought of as an insulating layer between the application and a specific provider implementation. For example, because an application uses the groupware schema, rather than the Microsoft Exchange® implementation directly, the same application can be used with Lotus Domino® collaboration server by simply switching the provider implementations. Schemas can consist of a hierarchy of abstract items and containers to resemble functionality provided by the collaboration server. Each item can contain one or more properties which can be implemented as key/value pairs. Containers can hold both items as well as other sub-containers. A root container may be obtained from the session which is instantiated with a particular service provider.

Specific item classes can exist for the different entities in the schema. For example, the groupware schema may contain item classes for tasks, appointments, contacts and mail messages. Regardless of what item class is used, however, the programing interface for manipulating its properties can preferably be the same in order to simplify access via the personal messaging interface.

The provider can be an implementation of one or more schemas that makes that schema interact with a specific backend system such as the collaboration server. For example, the Exchange/MAPI provider can be an implemenation of the groupware schema that connects to a MS Exchange collaboration server and the Lotus Domino provider can be an implementation of the schema that connects to the Lotus Domino server. Since the provider uses the low level interface to the collaboration server, much of the groupware functionality is exposed, while at the same time hiding the details and making the application appear as though it were a client of the collaboration server. In this manner, the application can connect to several collaboration servers via the schema just by switching the provider implementation.

In various embodiments, two types of collaboration can be supported by the personal messaging interface. First, message-centric collaboration can involve message transmission, storage and management and is commonly used in groupware systems such as Microsoft Exchange and Lotus Domino. Second, interaction-centric collaboration focuses on conversational sessions among two or more individuals in real-time, examples including text based instant messaging and interactive white board applications. The same abstract interface can be used for both types of collaboration, as both may share many of the same required software patterns. Service providers can provide implementations for different collaboration backends.

Figure 2:
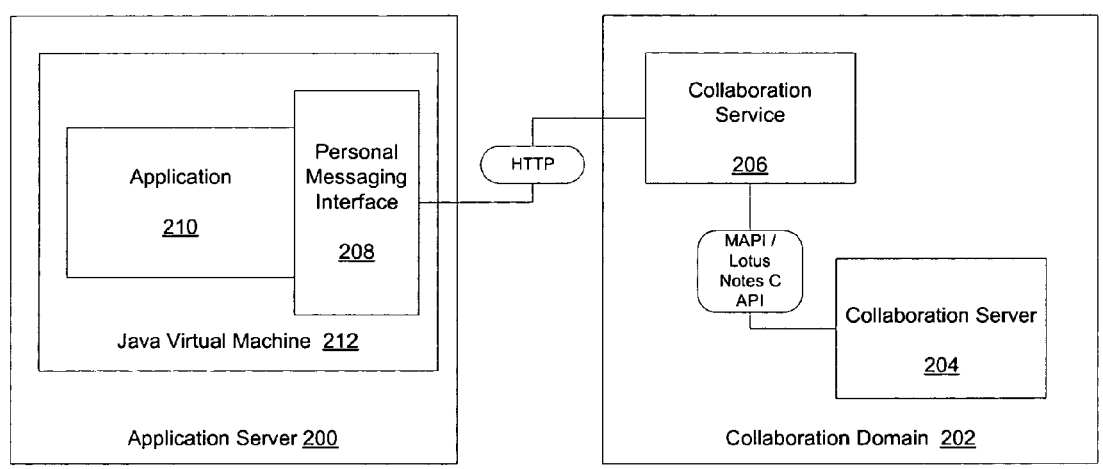
FIG. 2 is an illustration of the personal messaging interface as it relates to other components within an enterprise, in accordance with various embodiments of the invention.

FIG. 2 is an illustration of the personal messaging interface as it relates to other components within an enterprise, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, an application 210 can be developed and deployed on the application server 200 running a Java Virtual Machine 212. The personal messaging interface 208 can be integrated into the java based application by including the proper set of Java API libraries. The application can connect to the collaboration server 204 (e.g. MS Exchange server, Lotus Domino server, etc.) by first accessing a machine running the collaboration web service 206 via XML over HTTP/HTTPS. The collaboration service machine (e.g. Exchange service, Lotus Domino service, etc.) can then convert requests into remote procedure calls in the specific interface (e.g. MAPI calls or Lotus Notes C API calls, etc.) of the collaboration server 204 within the domain 202.

Figure 3A:
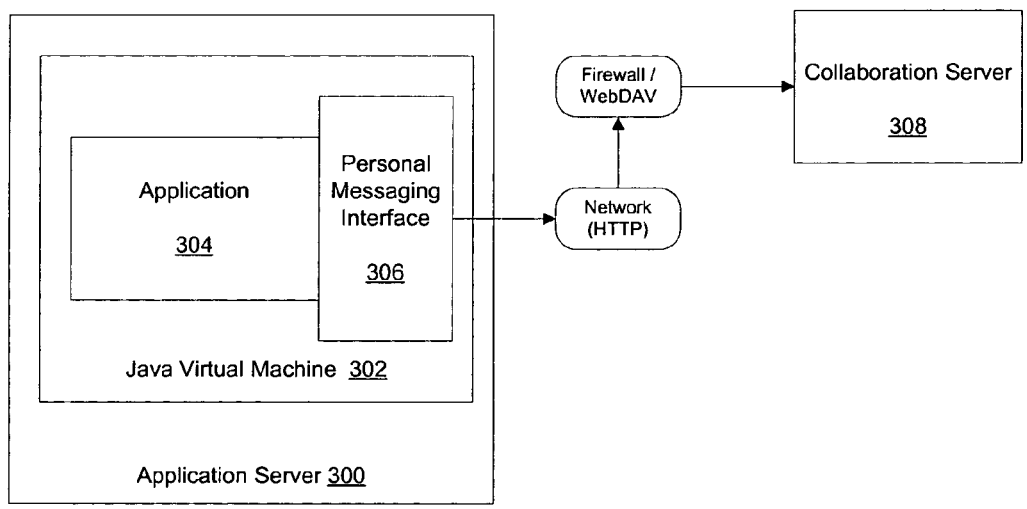
FIG. 3A is an illustration of an alternative implementation of the personal messaging interface as it relates to other components within an enterprise, in accordance with various embodiments of the invention.

FIG. 3A is an illustration of an alternative implementation of the personal messaging interface as it relates to other components within an enterprise, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the personal messaging interface 306 is integrated into an application 304 that is deployed in the same manner as in FIG. 2 on the JVM 302 running on an application server 300. However, in this embodiment, there is no collaboration service employed in order to integrate the application with the collaboration server 308. Instead, calls can be converted into WebDAV requests and submitted directly to the collaboration server over HTTP. WebDAV is a set of extensions to HTTP protocol (available from IETF group) which allows users to collaboratively edit and manage files on remote web servers. In response, the collaboration server can convert each request into a WebDAV response.

Thus, an enterprise can be provided with a choice of either implementation illustrated in FIGS. 2 and 3. Various factors may be considered when deciding which form of connectivity to implement. For example, specific interface calls to the collaboration server via a service may lessen the load on the collaboration server, but may require installation and configuration of an intermediary collaboration service machine. Similarly, connectivity via WebDAV can provide for an easier installation process but may create a heavier load on the server. In many cases, the optimal way to decide which mode of connectivity is better, is to to test both with the application and evaluate the IT requirements of the deployment against the results of that test.

Figure 3B:
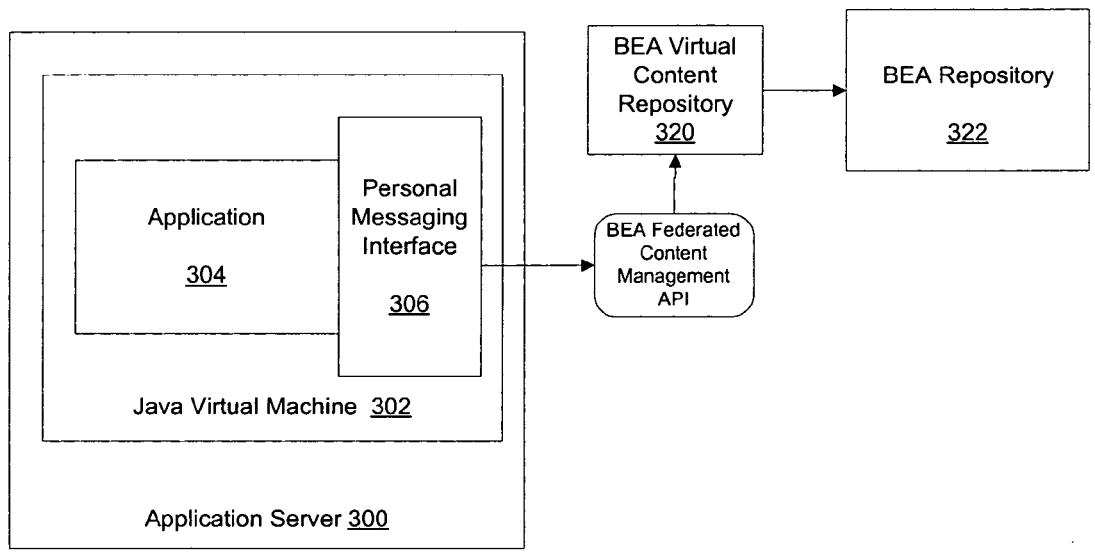
FIG. 3B is another illustration of an alternative implementation of the personal messaging interface as it relates to other components within an enterprise, in accordance with various embodiments of the invention.

FIG. 3B is yet another illustration of an alternative implementation of the personal messaging interface as it relates to other components within an enterprise, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the personal messaging interface 306 is integrated into an application 304 that is deployed in a similar manner as in FIGS. 2 and 3A, on the JVM 302 running an application server 300. In this embodiment however, the collaboration server is not the MS Exchange server or a Lotus notes server, but is instead a virtual content repository 320 such as is available from BEA Systems, Inc. The virtual content repository can allow for the management and delivery of content from multiple, heterogeneous repositories. It can also provide a single federated content management application programing interface (API) for allowing applications to access the various content provided thereon. The virtual content repository 320, the federated content management API and the BEA repository 322 are all part of the BEA WebLogic Portal platform, available from BEA Systems, Inc. The virtual content repository and the federated content management API are described in further detail in the U.S. patent application entitled "SYSTEM AND METHOD FOR PROVIDING AN SPI BRIDGE FOR CONTENT MANAGEMENT SYSTEM," by Ryan McVeigh et al. which is incorporated by reference herein.

As illustrated, the personal messaging interface can make calls in the BEA federated content management API, which goes through the virtualization layer (e.g. virtual content repository 320) which in turn goes to the actual repository 322. A BEA content management provider can be written to plug into the personal messaging interface in order to allow the application to access the various content maintained in the repository. It should be noted that it is not necessary that the BEA virtual content repository or the BEA actual repository be used. Other such virtualization layers can be implemented and are well within the scope of the invention. It is also worth noting that the virtual repository usually contains multiple actual repositories (not shown) similar to the BEA repository illustrated, for physically storing the content thereon.

Figure 4:
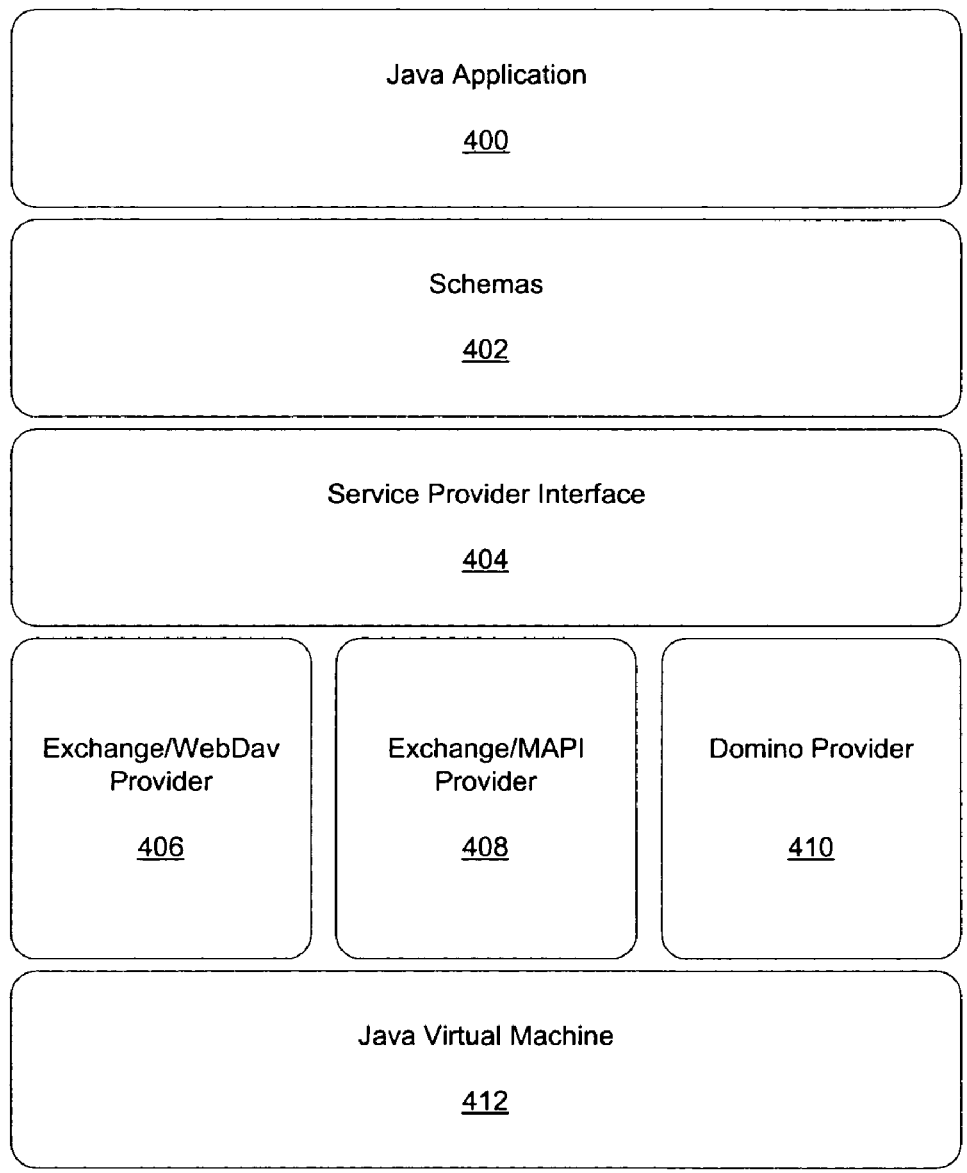
FIG. 4 is an illustration of the various software components of the personal messaging interface, in accordance with various embodiments of the invention.

FIG. 4 is an illustration of the various software components of the personal messaging interface, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, a Java application 400 running on a JVM 412 can use a schema 402 to access functionality and can leverage a hierarchy or combinations of various schemas, such as the groupware schema, exchange schema or the domino schema. The schemas are backed by a provider implementation 406, 408, 410 which can be chosen when the programmer creates a session using the interface. The schema can access the provider via the service provider interface 404. Each provider can be an implementation of a schema that connects to the specific collaboration server that is associated with that provider. In other words, the providers supply the backend collaboration implementation In one embodiment, a schema is a set of items and their properties, containers, enumerations and operations that can be performed on the items and containers. Schemas can extend other schemas, thereby supporting all the items in the super schema and possibly extending those items as well. The main schemas can be groupware, exchange and domino schemas as well as the instant messaging schema. All can inherit from the messaging schema class. By the term inheritance, it is meant that the schema has the same item classes and container classes, plus additional ones. Providers can also often implement extended schemas for access to the higher level schemas that the extended schema implements. For example, the exchange schema can contain additional item classes that are MS Exchange specific and thus not supported in the general groupware schema. However, because the exchange schema extends the groupware schema, the exchange provider still can fully support the groupware schema.

Figure 5:
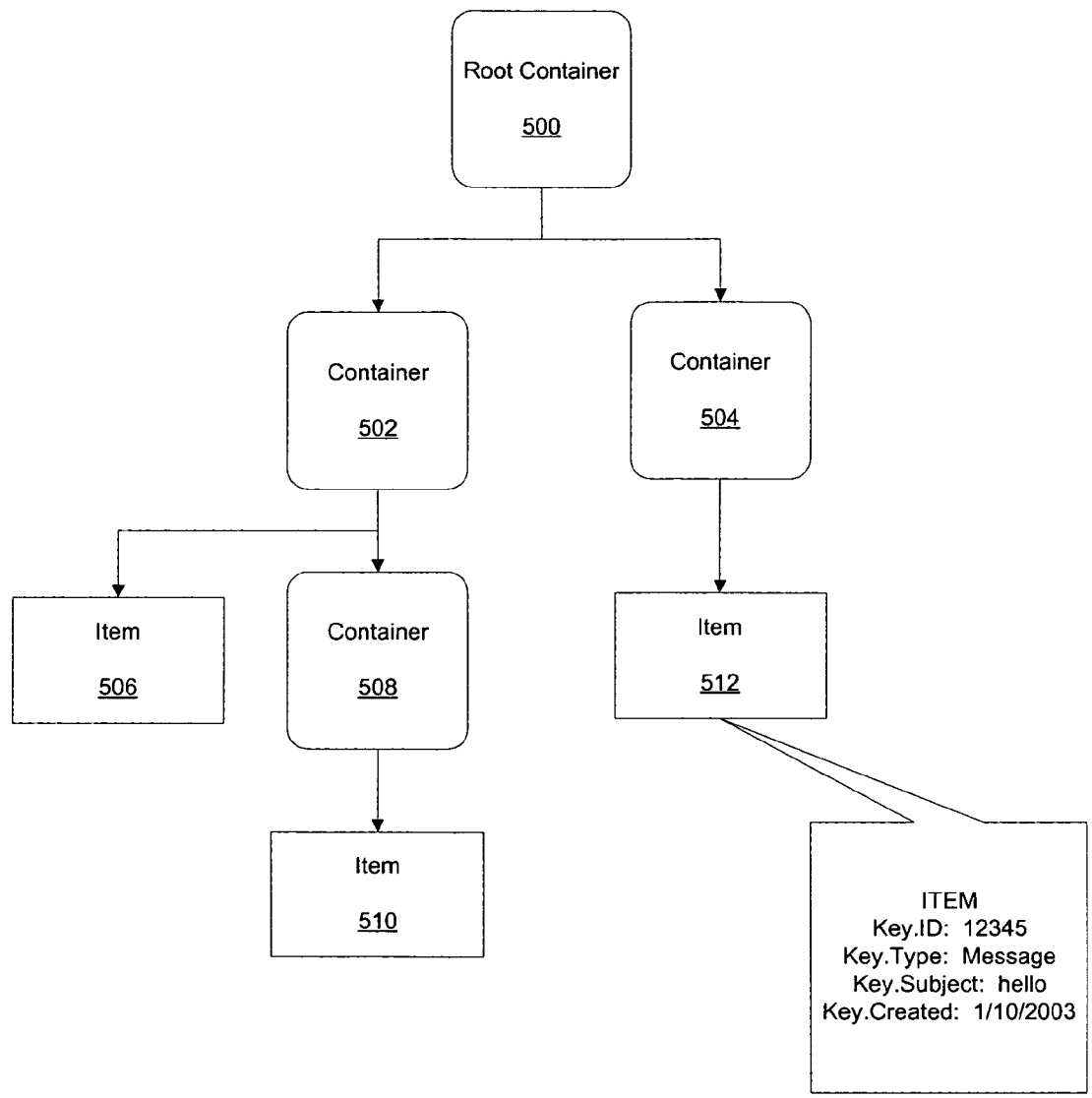
FIG. 5 is an illustration of the hierarchy of items and containers that can make up a schema, in accordance with various embodiments of the invention.

FIG. 5 is an illustration of the hierarchy of items and containers that can make up a schema, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, a schema can consist of various items 506, 510, 512 and containers 500, 502, 504, 508. A container can be a specialized type of item that can hold other items. Each item can have a set of properties, which are key/value pairs stored on the items. These items, while concrete, typically represent different things depending on the provider in use. For example, an item in a groupware provider could be an email message or an appointment, while an item in an instant messaging provider could be an instant message.

In one embodiment, message-centric collaboration can be done by accessing items (in this case messages 512) in a user's mail store, and calling specific methods on these items. For example, a developer can call a method to send a message, assign a task, add a new contact, move an email message to another folder and so on, all without having to know the complexities of the underlying collaboration system. Interaction centric collaboration, on the other hand, can involve getting and adding items to specialized containers and registering event handlers to be notified of item changes. Thus, by using the classes in the groupware schema, the developer can be insulated from needing to know the specific storage structure or APIs of the collaboration system when accessing instant messages, mail, calendar, contacts, tasks and other objects.

In one embodiment, the classes in the groupware schema can access the collaboration server by first contacting an intermediary service machine that runs a collaboration service. For example, the exchange service can provide connectivity to MS Exchange as an intermediary between Java and the MAPI interface subsystem.

In one embodiment, it is preferable that HTTP or HTTPS traffic is able to pass between the Java application machine running the personal messaging interface and the collaboration server. This could be for example a port that is chosen and configured by a system administrator. The link between the machines can cover a wide area network to traverse longer distances. It may be preferable, however, to place the service intermediary machine as close to the collaboration server as possible, in order to maximize performance.

In one embodiment, the developer can use the item and container classes (or classes of other schemas) during the building process of an application. In cases when that application needs to refer to a message or some other entity on the backend collaboration server, the developer can simply include code (e.g. method calls) referring to the item and container classes of the personal messaging interface. This way the developer is shielded from having to learn the specific implementation details of the backend system. Once the application is finished, it can be deployed and its classes instantiated. The provider can then handle the implementation of the item and container classes, as well as any extended schemas such that a connection can be created to the backend system and the application can perform various actions on objects and entities in that backend system. In this manner, the implemented item and container classes can be thought of as java wrapper objects for the connection to entities in the backend collaboration server. For example, a provider can implement a stub in order to gain access to the backend collaboration server. A stub can be a program module that represents a remote entity and it can be used to invoke methods on that remote entity. This remote entity can be a message residing on an instant messaging server or an appointment residing on an exchange server, for example. Other entities can include meetings, contacts, emails, attachements, folders, as well as any other objects or units that are provided by the collaboration server. Thus, a stub is capable of making a set of core calls to the backend system. The provider can implement these core calls as well as support one or more schemas thereby providing access to the specific collaboration server.

Since the providers can be responsible for creating and maintaining connections, a developer need only switch the provider in order to grant the application an ability to function with a different collaboration server. This can be done by the developer, specifying at the beginning of the session which collaboration server needs to interact with the application. Then an appropriate provider that is associated with that collaboration server can be used to implement connections to that server. The providers can also be switched or added at runtime without the need to reorganize the enterprise or redeploy the application. Thus, multiple instances and connections can be running at the same time, allowing the application to connect to different collaboration servers simultaneously.

One provider that can be implemented is capable of communicating with the collaboration server directly by writing to the WebDAV protocol, thereby accessing its functionality. Another provider can communicate with an intermediary collaboration service machine in native Java where the intermediary service can then convert each call into that collaboration server's specific interface calls (e.g. MAPI). The intermediary service machine can allow for more extensive functionality to be retrieved from the collaboration server because communications arive at that server in its specific API. However, this may involve a separate service being deployed on the network thereby consuming resources. In cases where the collaboration server does not support WebDAV protocol, this type of provider may be preferable. In any case, the user can be provided the ability to configure this feature.

Figure 6:
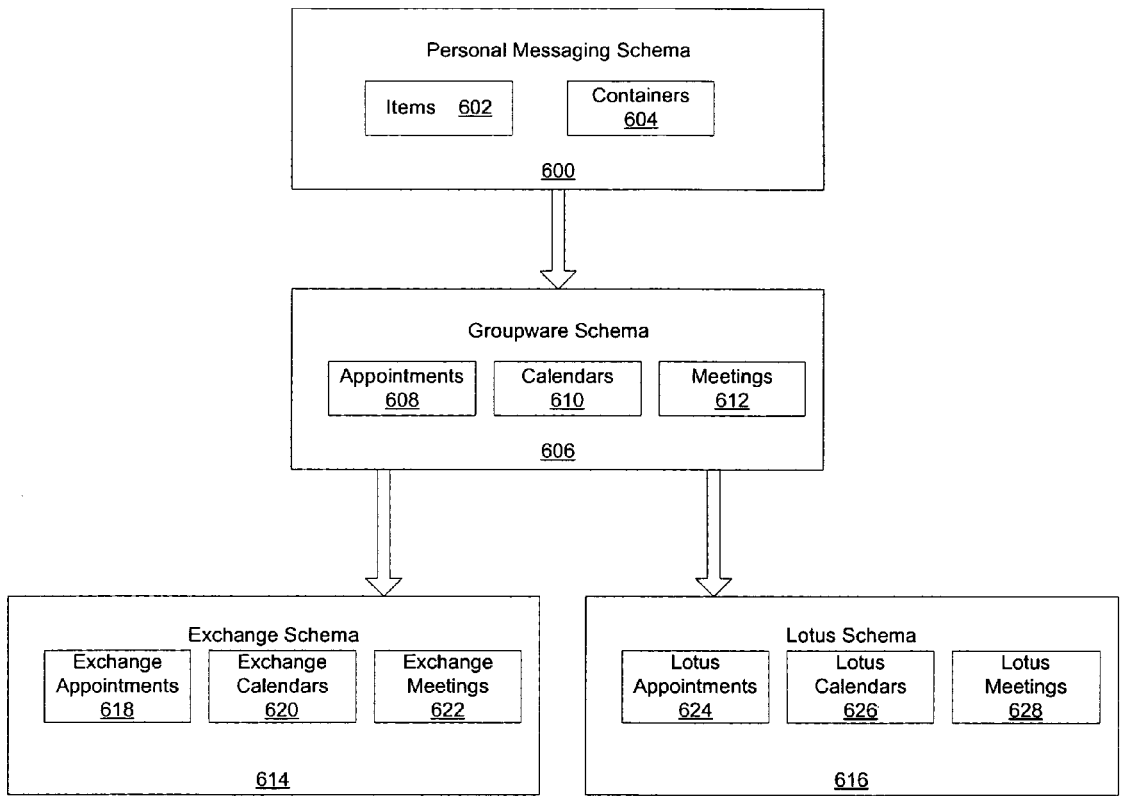
FIG. 6 illustrates a sample hierarchy of schemas as used in the personal messaging interface, in accordance with various embodiments of the invention.

FIG. 6 illustrates a sample hierarchy of schemas as used in the personal messaging interface, in accordance with various embodiments of the invention. Although this diagram may depict components as logically separate, such depiction is merely for illustrative purposes. It will be apparent to those skilled in the art that the components portrayed in this or other figures can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As illustrated, the personal messaging interface can include a personal messaging schema 600, a groupware schema 606, an exchange schema 614 and a lotus schema 616. These schemas can be hiearchically related and inherit from one another. For example, the groupware schema 606 can extend the personal messaging schema 600. and be extended by the exchange 614 and the lotus 616 schemas.

The personal messaging schema can implement item classes 602 and container classes 604 which contain various items. In the extended groupware schema, these items and containers can be made into groupware entities classes (i.e. functionality provided by most collaboration servers) such as appointments 608, calendars 610 and meetings 612. Other such entities are not shown in the figure for purposes of simplicity, but they may include, mail messages, attachements, tasks, contacts as well as other types of entities commonly available in groupware systems. Via the use of these groupware entities classes, the groupware schema can implement functionality that is more specific than mere items and containers, (e.g. functions like sending messages, scheduling an appointment, etc.) but still span across multiple groupware providers.

On the other hand, one specific collaboration server may have functionality that is not common to other such servers, and the developer may wish to access this functionality as well. In this scenario, the developer can implement the collaboration server-specific schemas, such as the exchange schema 614 and the lotus schema 616. As an example, the exchange schema can further define classes which are more specific to exchange type of functionality, such as exchange appointments 618, exchange calendars 620 and exchange meetings 622. Similarly, the lotus schema can implement classes specific to lotus functionality such as lotus appointments 624, lotus calendars 626 and lotus meetings 628.

A developer can write code at any level of the hierachy. For example, one application may be created at a high level, implementing the personal messaging schema and may not employ specific groupware functionality. On the other hand, another application may desire to access methods specific to exchange collaboration server. The developer is provided with such options and the applications can be made to interfunction with all such backend systems.

Figure 7:
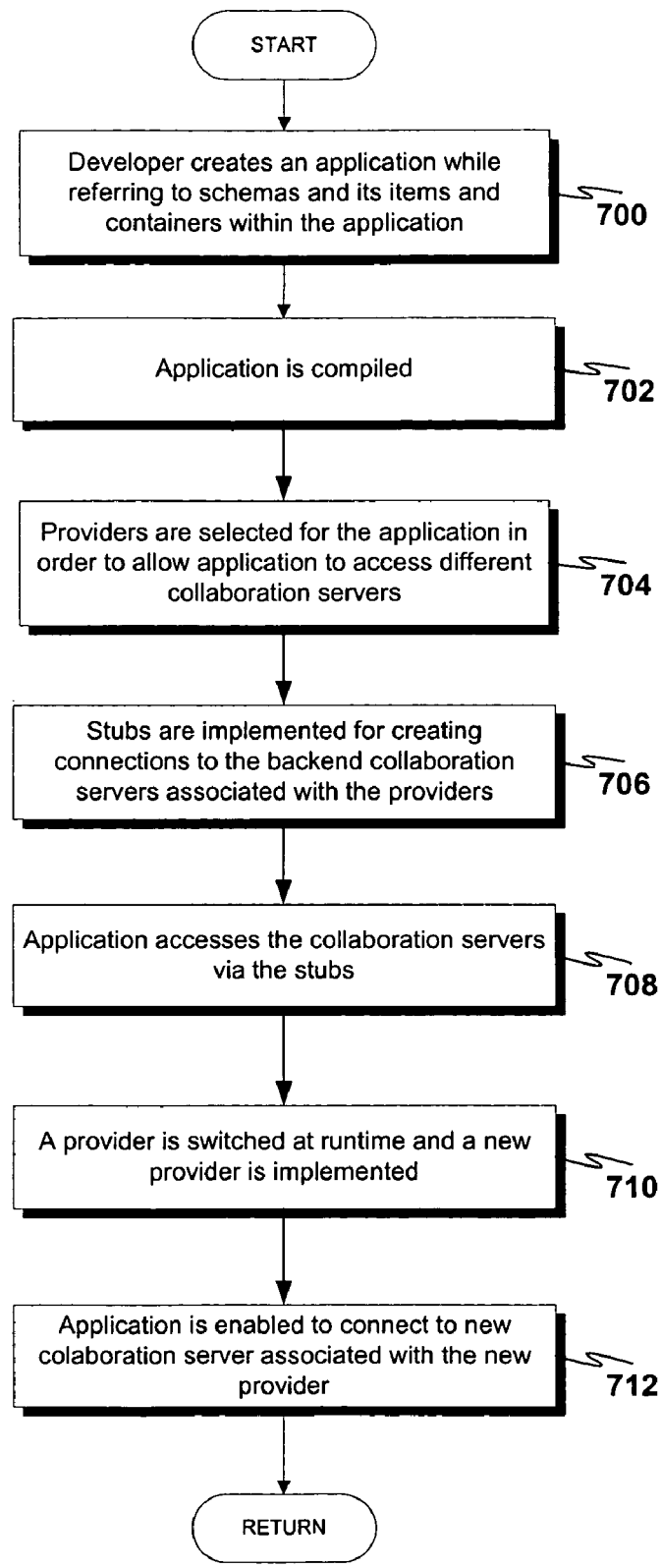
FIG. 7 is an exemplary flowchart illustration of a functionality of the personal messaging interface, in accordance with various embodiments.

FIG. 7 is an exemplary flowchart illustration of a functionality of the personal messaging interface, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 700, application development can involve writing code to implement various functionality as needed by an organization. While writing code for the application, a developer can refer to the various classes of the schemas, as described above, such as items, containers, announcements, messages and others. The application, once created, need not have any reference to specific application programming interface calls of the backend collaboration server.

In step 702, the application is then compiled and deployed (typically on an application server) to provide various services within the organization. The developer or some other user within the organization can then select the appropriate providers for the application, as illustrated by step 704. These providers can determine which collaboration systems the application will be able to connect to and to communicate with. For example, if an Exchange provider is selected for the application, the application will be able to connect to an Exchange server and access functionality therein. It should be noted that the providers can be selected dynamically (at runtime), statically (at compile time) or automatically implemented by the system. Furthermore, multiple providers can be chosen for a single application, thereby creating multiple connections to various collaboration servers and allowing the application to gain access to the functionality provided therein.

In step 706, various stubs can be istantiated to allow the selected providers to achieve their purpose. For example, stubs can be programs that make core calls to the backend collaboration server, while at the same time implementing the schemas as previously described. In this manner the stubs can extract the functionality from within the specific collaboration system and map it to the various schemas (as well as items and containers) in the personal messaging interface. In various embodiments, a stub can also cache various method calls so as to improve latency and access speed to the collaboration server.

In step 708, the application can take advantage of the stubs in order to access functionality within the backend collaboration system. For example, an application can manipulate email messages and attachements, schedule appointments, send instant messages and perform various other functions provided by the backend groupware system.

As illustrated in step 710, the providers can be switched at runtime, after the application has been deployed. For example, the organization may wish to install a new collaboration server in order to add products and services to its employees. By merely switching the providers, the application can be enabled to access the new collaboration server without the need to rewrite code or to redeploy the application, as illustrated in step 712. In this fashion, legacy applications can take advantage of new groupware systems without interruption to the services provided thereby.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, Rams, EPROM's, EPRO'Ms, Drams, Rams, flash memory of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can also include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method for integrating an application with a collaboration server, said method comprising:
   providing an application programming interface (API) that includes hierarchy of schemas sharing inheritance relationships, said hierarchy including a personal messaging schema, a groupware schema and a collaboration server-specific schema, wherein, the personal messaging schema abstracts functionality of the collaboration server as a set of item classes and container classes that contain said item classes, wherein the groupware schema extends the personal messaging schema to further include a set of groupware entity classes, and wherein the collaboration server-specific schema extends the groupware schema to further include a set of classes specific to the type of said collaboration server;
   providing, in said API, a plurality of providers that implement said hierarchy of schemas, wherein each of the providers is associated with a different type of collaboration server and enables the hierarchy of schemas to interact with said type of collaboration server;
   receiving a selection of at least one of said providers for the application after the application has been compiled; and
   accessing, via the provider, the functionality in the collaboration server by the application at runtime as defined by the hierarchy of schemas, wherein the provider invokes methods on said collaboration server based on at least one schema in the hierarchy of schemas.

2. The method of claim 1, further comprising:
   instantiating a stub for the provider, the stub adapted to create a connection to the collaboration server and to receive method calls from the schema classes in the application and to map the method calls to functionality in the collaboration server.

3. The method of claim 1 further comprising:
   dynamically switching the provider for the application to a new provider such that the application is enabled to access a different collaboration server that is associated with the new provider.

4. The method of claim 1 wherein the item has one or more properties which are key value pairs and the container is adapted to store one or more items or other containers.

5. The method of claim 4 wherein the item and the container are associated with entities residing on the collaboration server.

6. The method of claim 1 wherein the schema and the provider comprise a Java application programming interface employed by a developer in building Java applications.

7. The method of claim 1 wherein the schema extends other schemas so as to extend the functionality provided in the other schemas to more closely correspond to the functionality in the collaboration server.

8. The method of claim 7 wherein the provider supports the schema hierarchy because of Java class inheritance.

9. The method of claim 1 wherein the provider makes WebDAV calls directly to the collaboration server in order to allow the application to access the functionality in the collaboration server.

10. The method of claim 1 wherein the provider makes HTTP calls to an intermediary collaboration service machine which in turn translates the HTTP calls to specific interface calls on the collaboration server.

11. A system for integrating an application with a collaboration server, said system comprising:
    an application executed on a computing device;
    an application programming interface for allowing the application to invoke functionality in the collaboration server, the interface including a hierarchy of schemas sharing inheritance relationships, said hierarchy including a personal messaging schema, a groupware schema and a collaboration server-specific schema, wherein the personal messaging schema abstracts functionality of the collaboration server as a set of item classes and container classes that contain said item classes, wherein the groupware schema extends the personal messaging schema to further include a set of groupware entity classes, and wherein the collaboration server-specific schema extends the groupware schema to further include a set of classes specific to the type of said collaboration server;
    a plurality of providers included in said interface, wherein each provider is associated with a different type of collaboration server, and wherein the each provider implements the hierarchy of schemas and allows said application to invoke the functionality in the collaboration server;
    wherein a selection of at least one of said providers is received after the application has been compiled, and wherein the provider that is selected invokes methods on the collaboration server associated with said provider based on the hierarchy of schemas implemented by the application; and
    wherein switching the provider to a different provider enables the application to access another collaboration server with a different interface while maintaining the same hierarchy of schemas.

12. The system of claim 11 wherein the item class corresponds to an entity provided by the collaboration server.

13. The system of claim 12 wherein the provider is an implementation of the schema that associates the schema with entities on the collaboration server such that the application is capable of accessing those entities.

14. The system of claim 11 wherein the provider makes federated content management API calls to a virtual content repository in order to access the content provided thereon.

15. The system of claim 11 wherein the application is a Java application and the schema and providers comprise a Java application programming interface (API).

16. The system of claim 11 further comprising:
    a collaboration service deployed on an intermediary computer for translating method calls from the application to specific interface calls on the collaboration server.

17. The system of claim 11 wherein the provider makes WebDAV calls directly to the collaboration server via HTTP.

18. The system of claim 11 wherein a schema further includes a hierarchy of other schemas that extend the schema and add new classes not available in the schema in order to expose more functionality on the collaboration server.

19. A computer readable storage medium having instructions stored thereon which when executed by one or more processors cause the one or more processors to:

provide an application programming interface (API) that includes hierarchy of schemas sharing inheritance relationships, said hierarchy including a personal messaging schema, a groupware schema and a collaboration server-specific schema, wherein the personal messaging schema abstracts functionality of the collaboration server as a set of item classes and container classes that contain said item classes, wherein the groupware schema extends the personal messaging schema to further include a set of groupware entity classes, and wherein the collaboration server-specific schema extends the groupware schema to further include a set of classes specific to the type of said collaboration server;

provide, in said API, a plurality of providers that implement said hierarchy of schemas wherein each of the providers is associated with a different type of collaboration server and enables the hierarchy of schemas to interact with said type of collaboration server;

receive a selection of at least one of said providers for the application after the application has been compiled; and access, via the provider, the functionality in the collaboration server by the application at runtime as defined by the hierarchy of schemas, wherein the provider invokes methods on said collaboration server based on at least one schema in the hierarchy of schemas.

\* \* \* \* \*

UNITED STATES PATENT AND TRADEMARK OFFICE
CERTIFICATE OF CORRECTION

| | | |
|---|---|---|
| PATENT NO. | : 7,996,855 B2 | Page 1 of 1 |
| APPLICATION NO. | : 11/522240 | |
| DATED | : August 9, 2011 | |
| INVENTOR(S) | : Heist et al. | |

It is certified that error appears in the above-identified patent and that said Letters Patent is hereby corrected as shown below:

In column 2, line 15, delete "desireable" and insert -- desirable --, therefor.

In column 2, line 16, delete "acess" and insert -- access --, therefor.

In column 2, line 18, delete "desireable" and insert -- desirable --, therefor.

In column 5, line 18, delete "to to" and insert -- to --, therefor.

In column 8, line 17, delete "arive" and insert -- arrive --, therefor.

In column 9, line 3, delete "hierachy." and insert -- hierarchy. --, therefor.

In column 13, line 5, in Claim 19, delete "wherein" and insert -- wherein, --, therefor.

In column 13, line 15, in Claim 19, delete "schemas" and insert -- schemas, --, therefor.

Signed and Sealed this
Fifteenth Day of November, 2011

David J. Kappos
*Director of the United States Patent and Trademark Office*